July 4, 1944.   H. N. RIDER   2,352,995
AUTOMATIC SPRINKLER SYSTEM
Filed March 16, 1942   7 Sheets-Sheet 1

Inventor
Harry N. Rider
By W. B. Harpman
Attorney

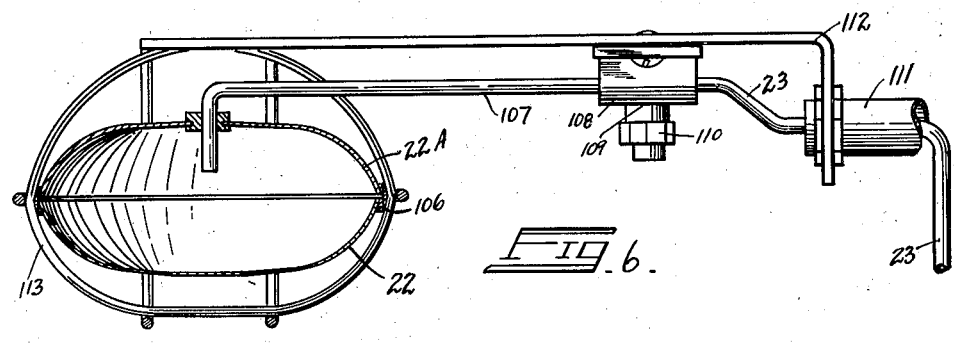
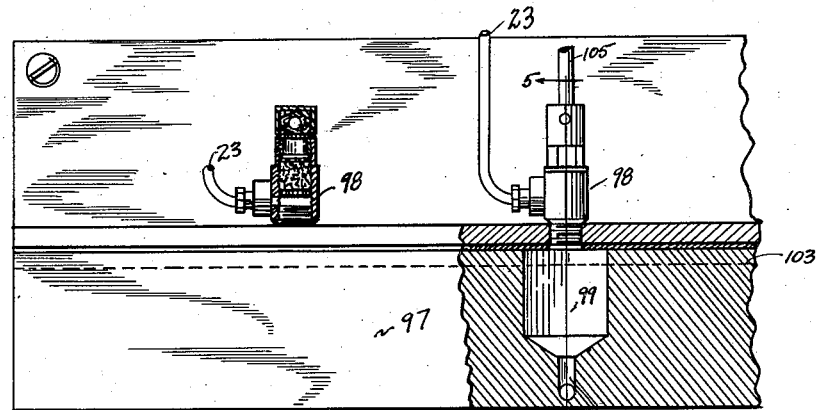
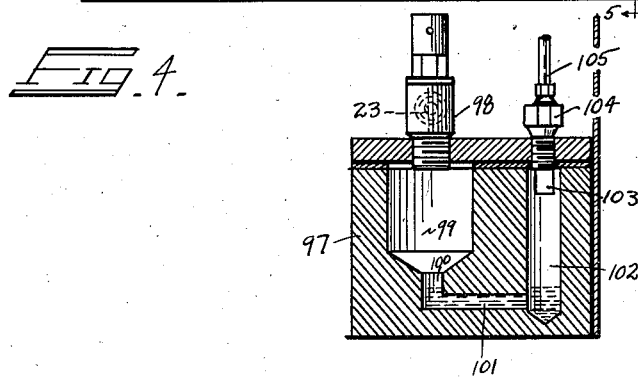

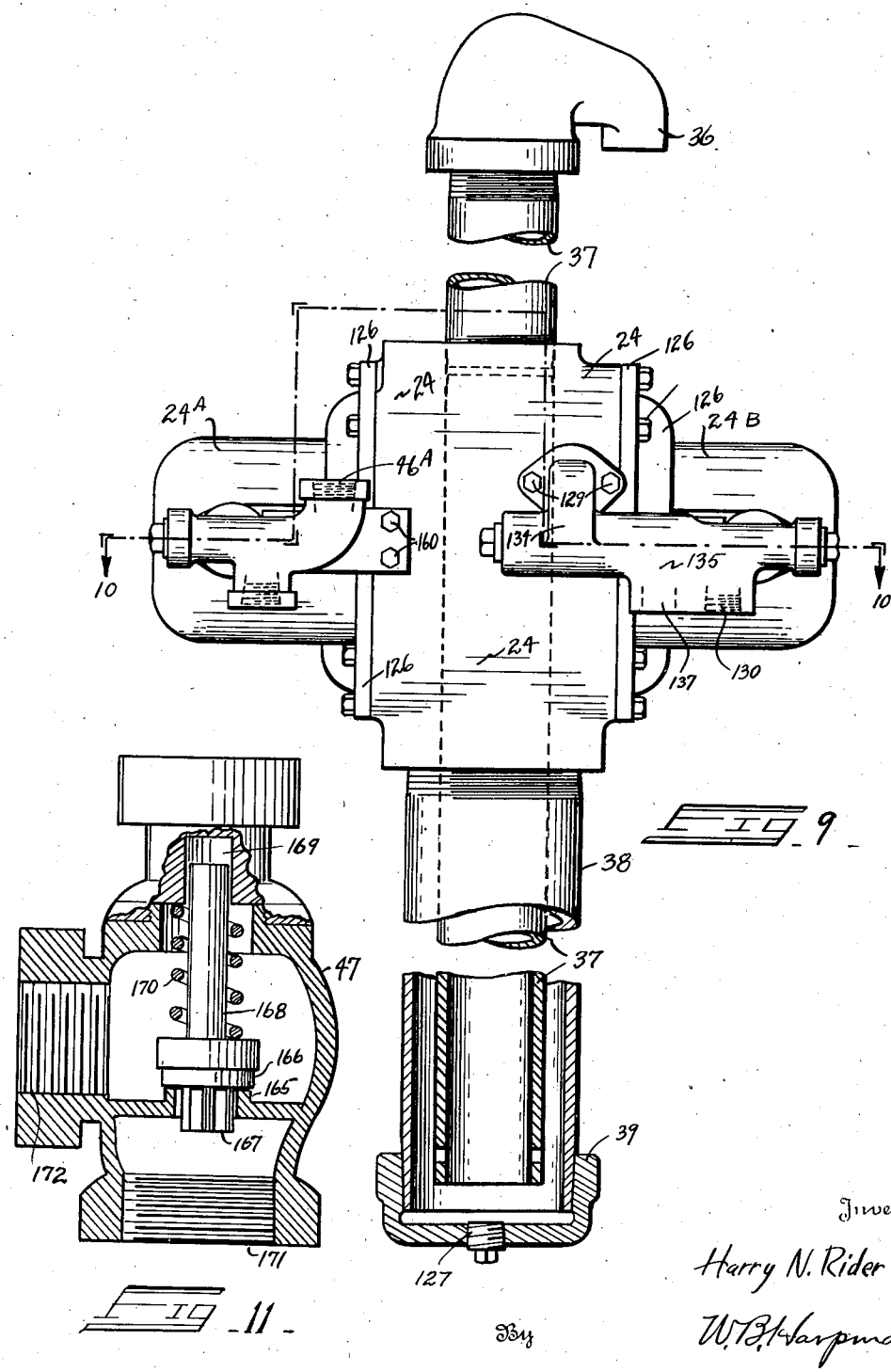

July 4, 1944. H. N. RIDER 2,352,995
AUTOMATIC SPRINKLER SYSTEM
Filed March 16, 1942 7 Sheets-Sheet 7
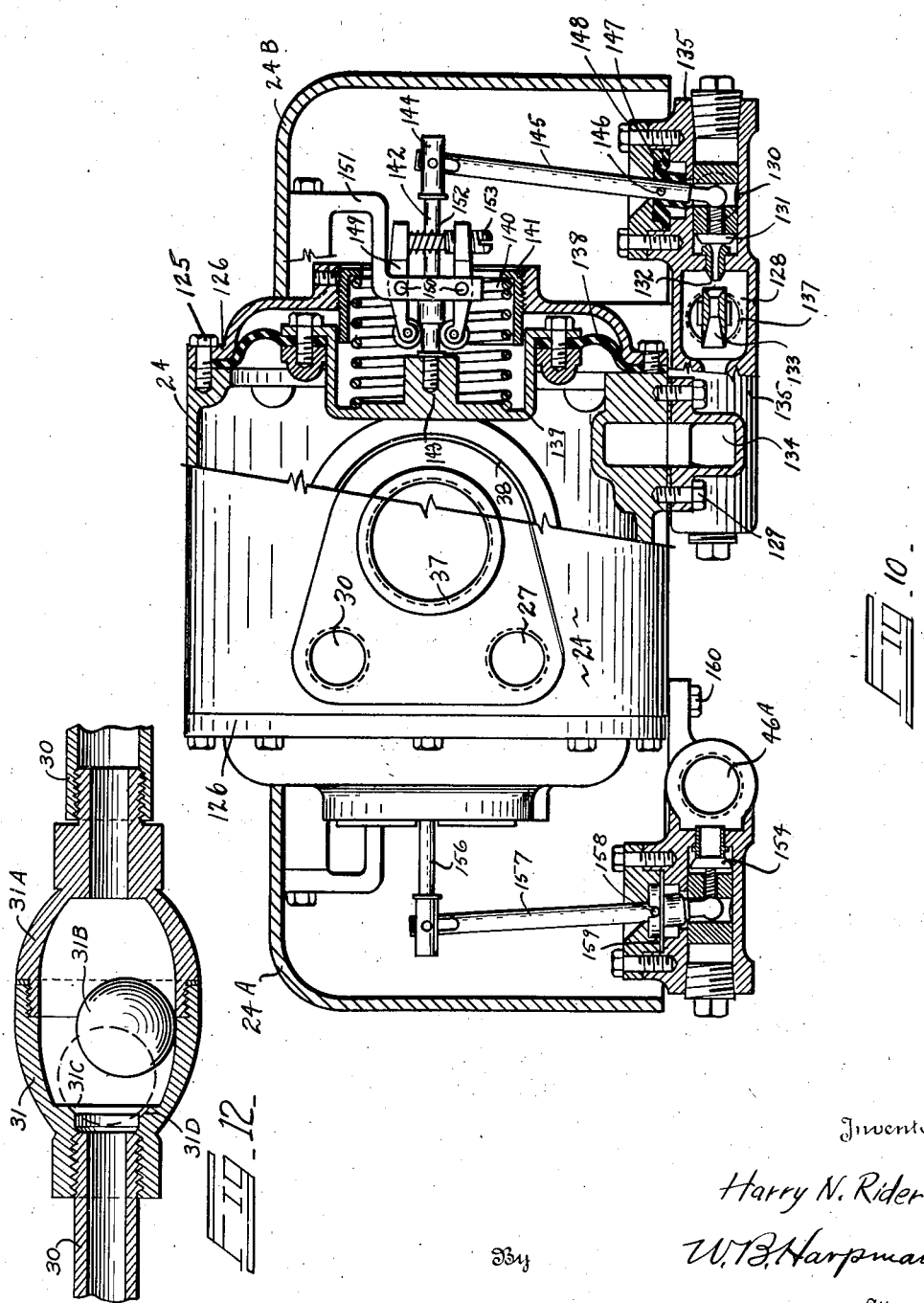

Patented July 4, 1944

2,352,995

UNITED STATES PATENT OFFICE 2,352,995

AUTOMATIC SPRINKLER SYSTEM

Harry N. Rider, Youngstown, Ohio, assignor to "Automatic" Sprinkler Company of America, Youngstown, Ohio, a corporation of Delaware Application March 16, 1942, Serial No. 434,857

4 Claims. (Cl. 169—17)

This invention relates to improvements to automatic sprinkler systems.

The principal object of the invention is the provision of a system of this character capable of wide application so that it can be installed in any type of structure and which will operate satisfactorily under any temperature condition.

A further object of the invention is the provision of an automatic sprinkler system which will require a minimum of attention and wherein the component parts of the system are so designed and arranged as to be capable of withstanding all ordinary treatment to which the system may be exposed.

A further object of the invention is the provision of an automatic sprinkler system incorporating a system of heat actuated devices located in the fire zones which heat actuated devices serve to actuate the sprinkler system.

A further object of the invention is the provision of an automatic sprinkler system in which air pressure is utilized to supervise both the system piping and heat actuated devices used in controlling the entrance of fluid to the same.

A further object of the invention is the provision of a sprinkler system including hydraulically operated means for supplying air under relatively low pressure to the thermally sensitive heat actuated devices of the system as well as to the piping of the sprinkler system.

A further object of the invention is the provision of an automatic sprinkler system wherein the main valve is automatically primed and wherein condensate and liquid residue are automatically drained from the distributing piping of the system.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein:

Figure 4 is a side elevation with parts broken away and parts in cross section illustrating a mercury check assembly used in connection with the actuating device illustrated in Figures 2 and 3.

Figure 5 is a cross sectional elevation taken on lines 5—5 of Figure 4.

Figure 6 is a greatly enlarged side elevation with parts in cross section illustrating one of the heat actuated devices used in connection with the actuating device of the fluid supply valve illustrated in Figures 2 and 3.

Figure 9 is a side elevation with parts broken away illustrating the air pump and alarm unit shown as a part of the automatic sprinkler and alarm system in Figure 1.

Figure 10 is a cross sectional elevation taken on lines 10—10 of Figure 9.

Figure 11 is a cross sectional elevation of an alarm valve.

Figure 12 is a cross sectional elevation of a velocity ball check valve, a part of the automatic sprinkler and alarm system shown in Figure 1.

Figure 1:
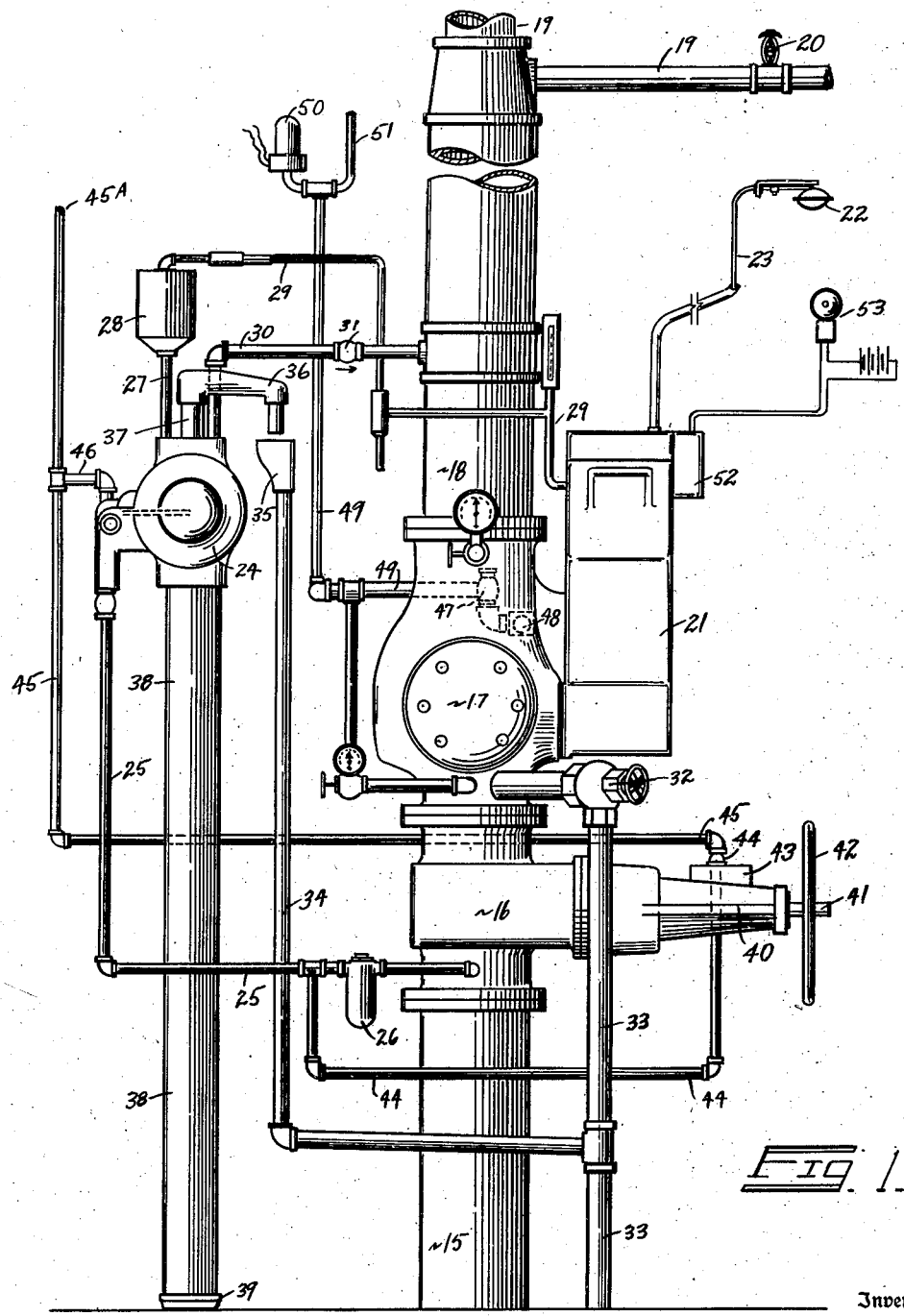
Figure 1 is an elevational view illustrating the automatic sprinkler and alarm system, the subject of this invention.

By referring to Figure 1 of the drawings, it will be seen that an automatic sprinkler and alarm system including the essential component parts thereof has been illustrated and wherein the fluid supply for supplying fire extinguishing fluid under pressure is introduced into the system through a fluid supply pipe 15 which is provided with a manually operated gate valve 16 which is normally open and with an automatically operated main valve 17 which controls the entrance of the fire extinguishing fluid to a riser 18 and various distributing pipes 19 which lead to the various fire zones to be protected, the said pipes and such branch piping as may be necessary being supplied with normally closed sprinklers 20. The main control valve 17 is automatically actuated and so designed that a clapper therein is held closed at such times as the system is not in operation. Means for causing the unlatching of the clapper of the valve 17 is included in an actuating device generally indicated at 21, forming a component part of the valve 17 and which actuating device forms a terminal for a plurality of heat actuated devices 22 which communicate with the actuating device 21 by means of pneumatic impulse tubing 23. The heat actuated devices 22 are located at desirable locations in the various fire zones in which the sprinklers 20 are located. In order to maintain supervisory air pressure in both the piping of the distributing system and the pneumatic tubing and heat actuated devices of the actuating portions of the system an air pump and alarm unit generally indicated at 24 is supplied with fluid under pressure through a supply pipe 25 which communicates with the main supply pipe 15 below the gate valve 16. A filter 26 is positioned in the pipe 25 to insure the delivery of clean fluid to the air pump and alarm unit 24. Air pressure originated in the air pump and alarm unit 24 leaves the pump through two channels one of which, indicated by the numeral 27, communicates with a filter 28 which is adapted to remove the moisture from the air. Pipe 29 connects with the filter and with the actuating device generally indicated by the numeral 21 and thus air under low pressure is supplied by the air pump and alarm unit 24 to the actuating portions of the system. The second tubular connection 30 leaves the air pump and alarm unit and as may be seen, the same is preferably formed of larger tubing than the line 27 and 29 and communicates directly with the riser 18 of the sprinkler system above the main valve 17 by way of a velocity ball check valve 31 which permits the flow of air from the pump to the riser or the limited flow of liquid from the riser to the pump. The air in the piping of the sprinkler system is for supervisory purposes only such as to indicate the breakage of or damage of the piping of the system at which time air will be lost from the system faster than the pump 24 can replace it and an alarm incorporated with the pump structure will be given to indicate such damage and loss of supervisory air in the piping of the sprinkler system. The air pressure or lack of air pressure in the sprinkler system piping in no way effects the operation of the main valve 17 since the actuating device generally indicated at 21 is entirely dependent upon the system of heat actuated devices 22 for operation.

In order to provide for the draining of the system after the same has been in operation a valve 32 communicates with the main valve 17 and controls the communication thereof with a drain pipe 33. A branch pipe 34 also communicates with the drain pipe 33 and leads to a funnel 35 adjacent the air pump and alarm unit 24. The funnel 35 is intended to receive fluid overflowing from an L 36 which is positioned on the uppermost end of a secondary water leg 37 of the air pump and alarm unit 24. The secondary water leg 37 extends downwardly through the body member 24 of the air pump and alarm unit and terminates short of the bottom of a main water leg 38 of the air pump and alarm unit which is provided at its lowermost end with a cap 39. The air pump and alarm unit is fully illustrated in Figures 9 and 10 of the drawings and will be more completely described herein.

Figure 8:
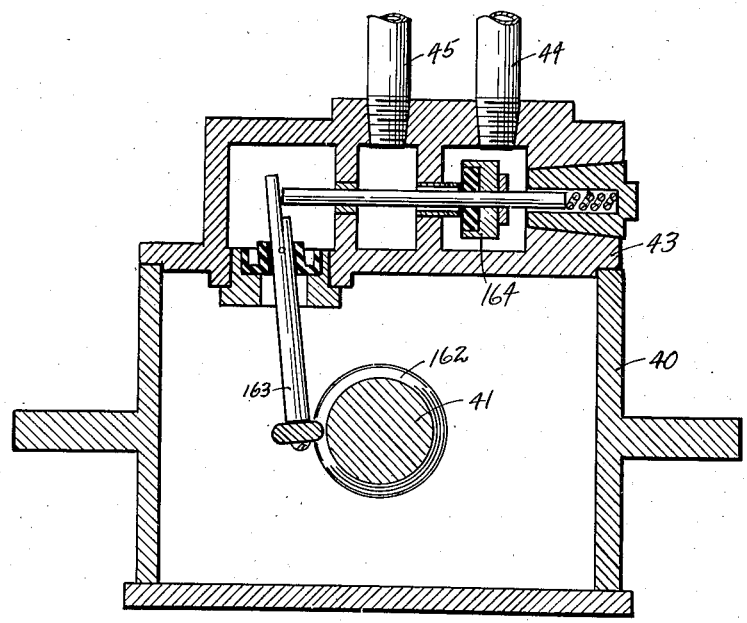
Figure 8 is a vertical sectional view illustrating a portion of the gate valve operating shaft and the alarm valve controlled thereby.

By referring again to the gate valve 16, it will be seen that a yoke 40 thereof partially encloses a gate valve operating shaft 41 which in turn is provided with a hand wheel 42. The yoke 40 has positioned therebeneath and attached thereto an alarm valve 43 which is illustrated in detail in Figure 8 of the drawings and described fully herein and which serves to cause an alarm to be given at such times as the gate valve 16 is closed or hand wheel 42 thereof moved. This is accomplished by the opening of a fluid valve in the mechanism 43 which permits fluid to flow from the pipe 25 through a pipe 44 and outwardly from the alarm valve 43 through a pipe 45 which passes in back of the main portions of the system and ascends to a remotely positioned fluid actuated siren (not shown), the remote position of which is shown in Figure 1 by the numeral 45A. It will also be observed that a connection is established between the pipe 45 and the air pump and alarm unit 24, the connection being shown by the numeral 46, which is provided to permit the remotely positioned fluid actuated siren to be sounded at such time as the alarm portion of the air pump unit 24 goes into action as upon a reduction of the air pressure in the sprinkler system piping 18 and 19 which results in a reduction of pressure in the air pump and alarm unit 24 and permits a fluid control valve therein to open and permit the flow of water from the pipe 25 through the pipes 46 and 45 to the fluid powered siren at 45A.

In order that an alarm may be given at such time as the sprinkler system goes into operation as in extinguishing a fire, a separate and distinct means is employed which comprises an alarm valve 47 which communicates with the body of the automatic valve 17 above the clapper thereof by way of a fitting 48. Water under pressure flowing into the sprinkler system will flow into the fitting 48 and cause the alarm valve 47 to open and flow therefrom through a pipe 49 to a pressure actuated electric switch 50 which may be obviously connected with any desirable signaling circuit, and fluid may also flow through a pipe 51 to a remotely positioned fluid powered alarm (not shown).

In order to insure an alarm being given upon the sprinkler system's going into action, still another separate and distinct alarm is provided and which comprises an alarm switch generally indicated at 52 which forms a part of the valve actuating mechanism generally indicated at 21. The switch 52 as is fully illustrated in Figure 2 of the drawings and described more fully herein, functions upon the actuation of the mechanism generally indicated at 21 and closes causing an electric bell or other desirable signal 53 to be given. The switch 52 is also provided with a manual button so that an alarm can be originated therethrough.

It will thus be seen that the automatic sprinkler and alarm system comprises primarily the automatic valve 17 and its actuating mechanism generally indicated at 21, and an air source for supplying air under pressure to both the sprinkler system piping and the system of heat actuated devices 22, and that the operation of the sprinkler system depends upon the satisfactory operation of this automatic valve 17.

Figure 2:
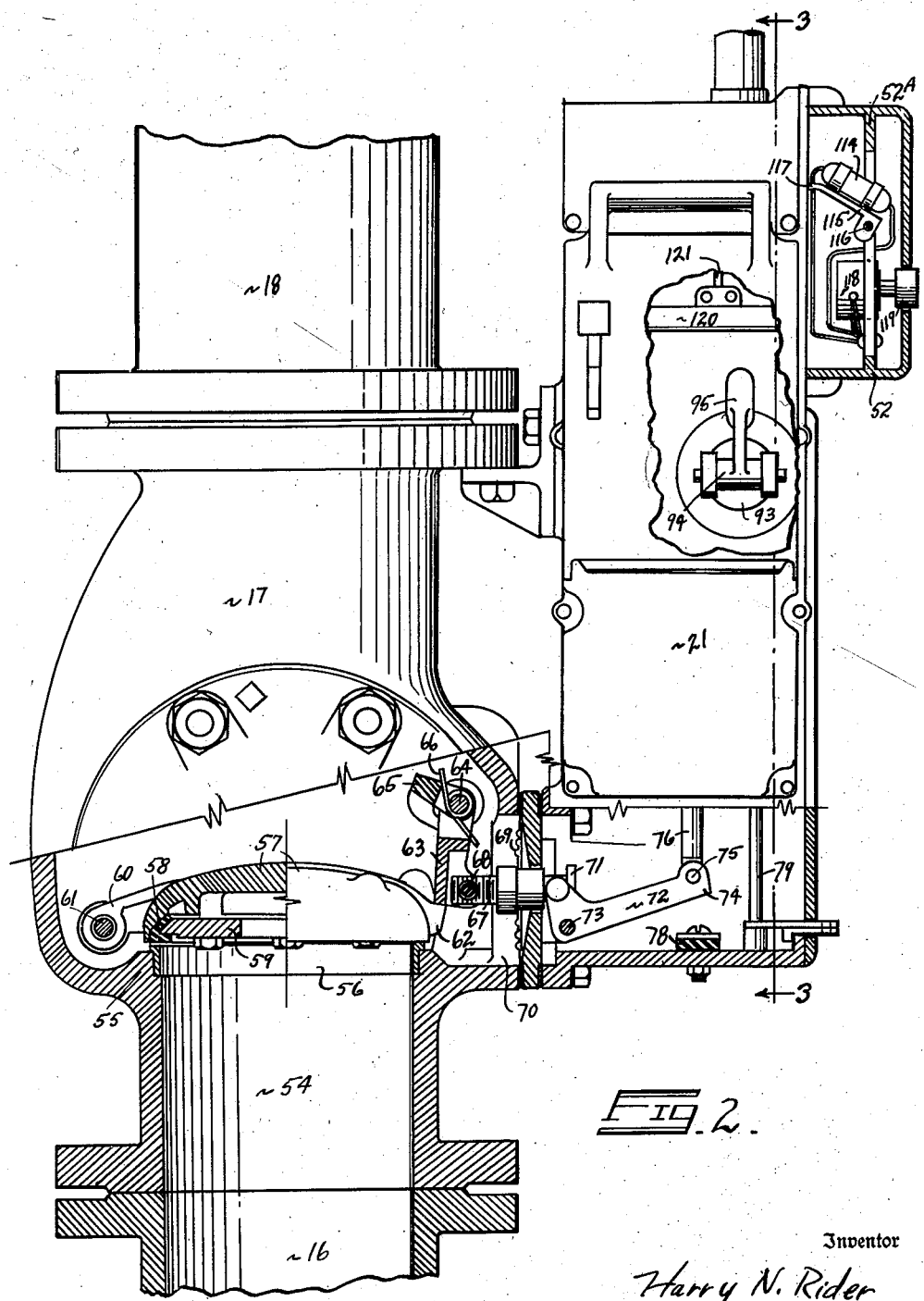
Figure 2 is an elevational view partially in cross section of the main fluid supply valve and actuating device therefor.
Figure 3:
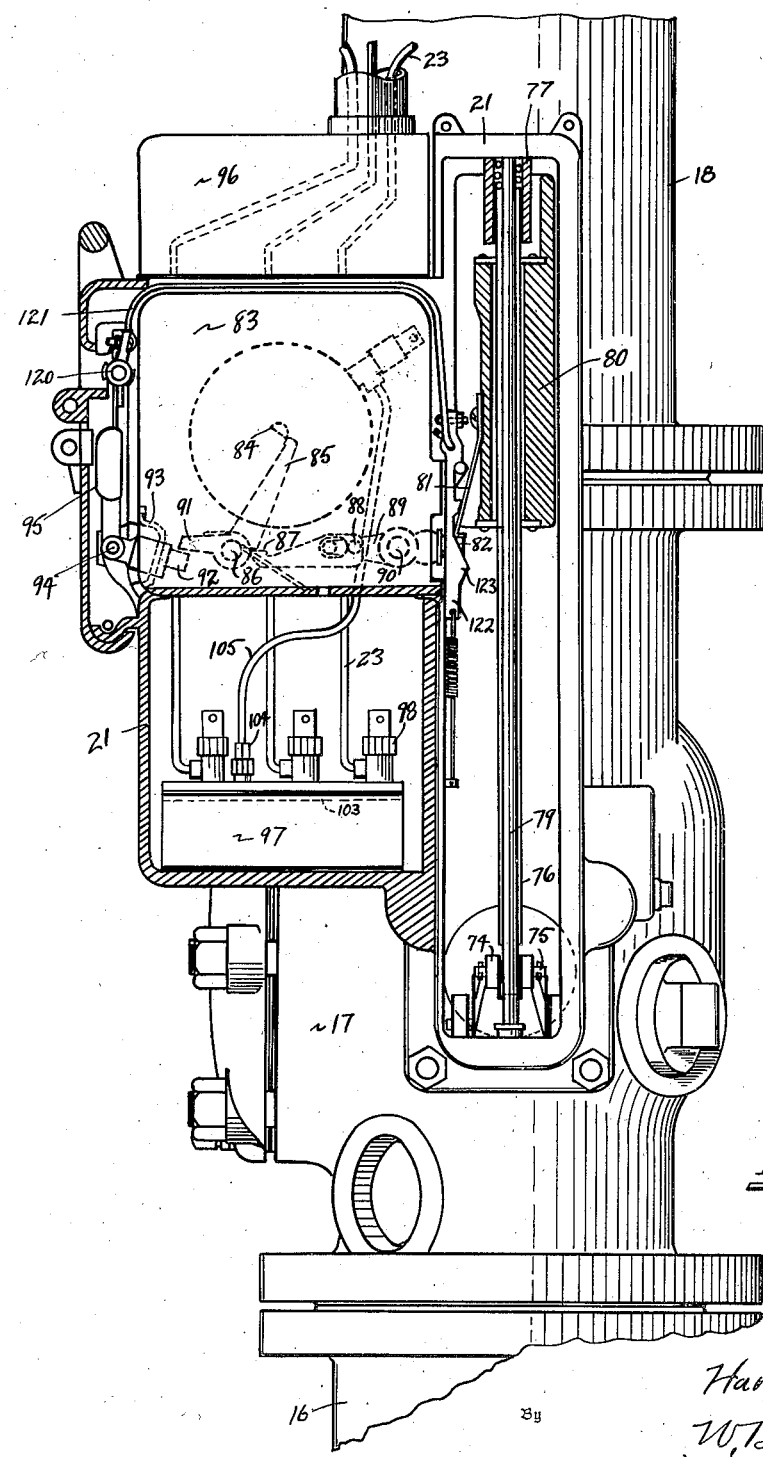
Figure 3 is a cross sectional side elevation taken on lines 3—3 of Figure 2.

By referring now to Figures 2 and 3 of the drawings, a detailed illustration of the valve 17 and the actuating mechanism may be seen. By referring to Figure 2 in particular, it will be noted that the automatic valve 17 comprises a body indicated by the numeral 17 in which the water inlet is indicated at 54. In order that the water inlet 54 may be effectively separated from the remainder of the valve body, an annular shoulder 55 is provided with a seat ring 56 adapted to receive a clapper 57, which serves to effectively control the admission of fluid into the valve body from the water inlet 54. A suitable rubber facing 58 is affixed to the clapper 57 by means of a clamping ring 59 which is in turn affixed to the clapper by means of a plurality of bolts.

The clapper 57 is formed with a pair of hinge arms 60 adapted to pivot about a hinge pin 61 so as to effectively hinge the clapper in relation thereto. The hinge pin 61 is carried on suitable bushings positioned in the valve body 17. In order that the clapper 57 may remain in closed position on the fluid inlet 54 and thus prevent the passage of fluid through the valve, a latch mechanism is positioned within the valve body and adjacent to a shoulder 62 formed on the clapper 57. The latch mechanism comprises a latch 63 pivoted to the valve body by means of a latch hinge pin 64 so that horizontal movement imparted to the lower end of the latch 63 results in moving it from its seat on the shoulder 62 of the clapper 57, thus effectively releasing the clapper 57 and permitting fluid in the fluid inlet 54 to raise the clapper 57 and flow through the valve into the riser 18. Still referring to the latch mechanism, it will be seen that the latch 63 has an anti-reseating portion 65 pivoted thereto and adapted to prevent the clapper 57 from reseating. In order that the anti-reseating latch 65 may remain in effective operating position, a latch spring 66 is utilized which serves to position the anti-reseating latch portion 65 in operative relation to the clapper 57 at all times.

In order that movement may be imparted to this latch 63 so as to result in the opening of the clapper 57, a latch link 67 is pivoted at its innermost end to the latch 63 by means of a link pin 68. This latch link 67 passes centrally through and is affixed to a circular latch link diaphragm 69 which is positioned in a water tight manner across an opening 70 in the valve body 17. The latch link 67 passes through an opening in the diaphragm 69 and is affixed therein in a water tight manner. A portion of the latch link extends outwardly therefrom and comprises in effect a T-headed connection section 71 adapted to receive in a movable manner a latch arm 72 which is part of the valve actuating mechanism 21, which comprises a vertically positioned actuating mechanism box bolted to the valve body 17 at a point thereon adjacent the opening 70 thereof, so that its mechanism effectively imparts movement to the latch link 67. The latch arm 72 is pivoted by means of a hinge pin 73 to the box 21 and is adapted to impart movement to the latch link 67. In order that the latch arm 72 may receive movement suitable for actuating the latch link 67 and in turn the latch 63, an end 74 thereof is pivoted by means of a pin 75 to the lowermost end of a vertically positioned guide rod 76.

Figure 7:
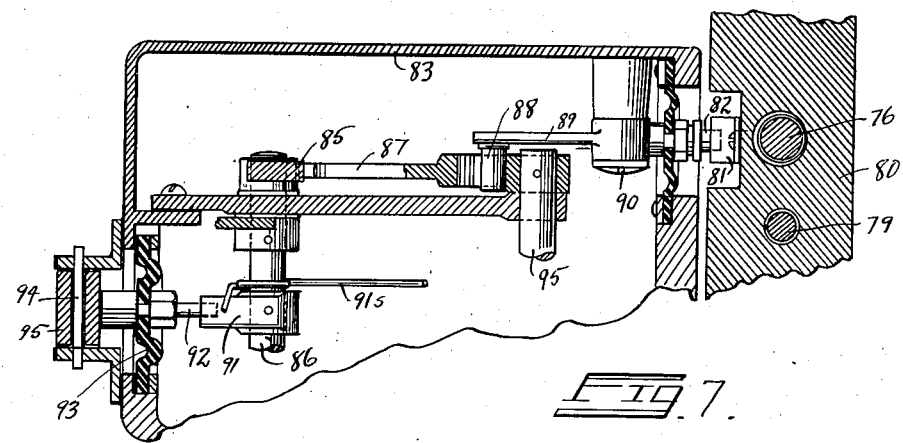
Figure 7 is a horizontal partial sectional view of the weight supporting levers of the release forming a part of the actuating device for the fluid supply valve illustrated in Figures 2 and 3.

By referring to Figure 3 of the drawings, it will be seen that the uppermost end of this guide rod 76 is slideably positioned within a sleeve 77 which is in turn carried upon the vertically positioned box 21. By referring again to Figure 2 of the drawings and to the lowermost portion of the actuating mechanism box 21, it will be seen that a bumper 78 is provided beneath the outermost end of the latch arm 72 and that a secondary guide rod 79 is positioned vertically adjacent the guide rod 76. By referring now to Figure 3 of the drawings, it will be seen that an actuating weight 80 is positioned upon the guide rods 76 and 79 and is suspended in elevated relation thereon by means of a support 81 which takes the form of a vertically positioned yieldable member and which is adapted to rest upon a protruding end of a supporting finger 82 thus holding the weight 80 in elevated position in the box 21 on the guide rods 76 and 79. The supporting finger 82 forms a part of a pressure responsive release mechanism 83 which pressure responsive release mechanism 83 comprises in part the subject matter of United States Patent No. 2,099,069 of November 16, 1937, to E. A. Lowe et al.; wherein its complete structure and operating principles are adequately set forth. In order to simplify the present disclosure, this pressure responsive release mechanism 83 and its structure are not herein described, claimed, or illustrated as they are adequately set forth in the above mentioned patent and are therefore well-known in the art. In the present disclosure, a variation of air pressure in the tubing 23 communicating with the valve actuating mechanism generally indicated at 21 in the drawings and in particular with the pressure responsive release mechanism 83 results in the movement of a pressure sensitive diaphragm in the pressure responsive release mechanism which permits a partial rotation of a milled shaft 84 which in turn permits a lever 85 to move and through a system of levers 86, 87, and 88 also permits a latch lever 89, which is formed with the supporting finger 82 thereon, to rotate about a pivot 90. In operation, as described in the above mentioned patent to Lowe and in the present device, the partial rotation of the latch lever 89 about the pivot 90 comprises the complete movement upon which the release of the weight 80 depends. In the present disclosure as is shown in Figure 3 and illustrated in large detail in Figure 7, the release mechanism 83 has been modified slightly with respect to the placement of certain external levers particularly as concerns the resetting levers thereof which have been moved to one side of the release mechanism 83 and in so doing a spring 91S has been substituted for a weight heretofore used to activate the lever shaft 86 of the mechanism. In order that the lever 85 may be moved to reset position as shown in dotted lines in Figure 3 an extended lever 91 has been positioned on the lever shaft 86 and arranged so that a reset finger 92 may be engaged therebeneath to elevate the extended lever 91 and reset the lever 85 with respect to the milled shaft 84 and thus permit the lever 87 to be retained beneath a keeper portion of the lever 85. The reset lever 92 extends outwardly through a flexible diaphragm 93 and terminates in a connection 94 which as is illustrated in Figure 3 has attached thereto a reset handle 95. A front elevation of this reset handle 95 is shown in detail in Figure 2 of the drawings. In operation the reset handle is moved downwardly which causes the innermost end 92 of the reset lever to move the extended lever 91 upwardly and thus cause the lever 85 to move into reset position. By referring again to Figure 3 of the drawings, it will be seen that the tubular connection 23 enters a junction box 96 at the uppermost portion of the actuating mechanism 21 and passes downwardly therefrom into space beneath the pressure responsive release mechanism 83 where it terminates in one portion of a mercury check assembly generally indicated by the numeral 97 and which mercury check assembly is illustrated in detail in Figures 4 and 5 of the drawings. By referring to Figures 4 and 5 of the drawings, it will be seen that pneumatic impulses conveyed to the mercury check assembly through the tube 23 communicate by way of a fitting 98 with a relatively large chamber 99, the bottom portion of which chamber 99 is cone shaped and provided with a downwardly extending channel 100. A horizontally positioned communication channel 101 leads to the bottom of an adjacent vertically positioned secondary chamber 102. The communicating channel 101 and the bottommost portions of the chamber 100 and 102 are adapted to contain a liquid check, such as mercury, which will be of an amount sufficient to prevent opening of the channel 101 by minor pneumatic impulses originated in the heat actuated devices attached to and communicating with the tubular connection 23. By referring again to the vertically positioned chamber 102, it will be seen that a horizontally positioned manifold chamber 103 communicates with each of the several chambers 102 comprising the mercury check assembly so that pneumatic impulses introduced into any one of a number of the fittings 98 to chambers 99 will after suitably displacing the liquid check, mercury, pass into horizontal manifold chamber 103 and thereby be placed in communication with a fitting 104 which in turn is attached to a tube 105 which as may be seen by again referring to Figure 3 of the drawings communicates directly with the diaphragm chamber of the release mechanism 83. In actual operation the mercury check assembly serves to control small impulses which would otherwise reach the release mechanism 83 and actuate the same which would release the weight 80 and cause the automatic valve 17 to open. As this action in the event of a small impulse originating from minor temperature changes in the fire zones in which the heat actuated devices 22 are positioned would be undesirable, the mercury check assembly serves the further purpose of preventing pressure in one group of heat actuated devices connected to one mercury check from being absorbed by heat actuated devies connected to another mercury check in the assembly and, furthermore, enables communication pipes from a plurality of the heat actuated devices 22 to be effectively grouped so that pneumatic impulses from a great many heat actuated devices can all be directed to a single pressure responsive release mechanism 83. A further description of the mercury checks and their mode of operation is not included in this disclosure as the same are essentially similar to a mercury check assembly set forth in the above mentioned Patent No. 2,099,069 in which a similar arrangement of mercury checks are illustrated, described, and claimed in connection with the pressure responsive release mechanism also set forth therein.

By referring to Figure 6 of the drawings a cross sectional elevation of the heat actuated device 22 is given and it will be seen that the heat actuated device comprises a pair of hemispherical shells 22 and 22A placed in opposed relation and clamped together around their rims at 106 so as to form an air tight air chamber. A tube 107 is introduced into the air chamber thus formed which tube 107 communicates with a fitting 108 which in turn is provided with an opening 109 to the atmosphere which is normally closed with a fusible plug 110 which plug is adapted to fuse upon reaching a predetermined temperature and thus open the fitting 108 to the atmosphere and as the tube 23 which communicates with the actuating mechanism of the valve 17 also communicates with the fitting 108, the result will be to permit the escape of the supervisory air pressure normally maintained in the heat actuated devices 22 and the tubes 23 which action will cause the unbalancing of the diaphragm in the pressure responsive mechanism 83 and cause the partial rotation of the milled shaft 84 which in turn through its system of weights and levers permits the weight 80 to drop and cause the valve 17 to be opened. The same action takes place upon the accidental breakage of the tube 23 as the loss of supervisory air pressure through the break actuates the valve and the valve alarm. In order that the tube 23 may be adequately protected, it is preferably carried throughout its length in a protective conduit 111 which in turn is attached to a mounting bracket 112 of the heat actuated devices 22. The heat actuated device chamber formed of the hemispherical shells 22 and 22A is supported beneath the bracket 112 by means of a supporting and protecting cage 113.

It will thus be seen that the rapid increase in temperature in fire zones protected by the automatic sprinkler and alarm system will cause a pneumatic impulse to be originated by the heat actuated devices 22 which will be conveyed back to the valve actuating mechanism 21 by means of the pneumatic impulse tubing 23. The impulse, being of sufficient intensity and capable therefore of passing through the mercury checks generally indicated at 97, will reach the pressure responsive mechanism 83 through the tube 105 and as has heretofore been explained, cause the weight 80 to drop and unlatch the clapper 57 in the automatic valve 17. In order that an alarm may be given when the weight drops indicating that the system is definitely going into operation in extinguishing a fire, a bell or other signal 53 as shown in Figure 1 is electrically connected to a switch box 52 forming a part of the valve actuating mechanism 21 and by referring to Figure 2 the switch 52 will be seen to comprise a mercury tube switch 114 positioned upon a tiltable bracket 115 which in turn is pivoted by means of a pin 116 to a structural portion of the switch box enclosure 52A, an extension of the bracket 115 indicated by the numeral 117 is adapted to extend into position above the weight 80 in the adjacent portion of the valve actuating mechanism 21 and to normally rest upon the weight 80 so as to hold the mercury switch 114 in open position as illustrated in Figure 2. It will thus be seen that at such time as the weight 80 drops the bracket 115 will pivot upon the pin 116 and cause the mercury switch 114 to be closed which will close a circuit through the bell or other signal 53. A manual switch 118 provided with a manual button 119 is also connected in the circuit so that a signal may be manually given if desired in connection with the manual actuation of the automatic valve 17 such as made possible by means of a manual pull 120 which is connected to a cable 121 as shown in Figures 2 and 3 of the drawings, the other end of the cable 121 being attached to a spring tensioned latch bar 122 which is vertically positioned adjacent the weight 80 and alongside the supporting finger 82 of the pressure responsive release mechanism 83. As best shown in Figure 3 of the drawings, this latch bar 122 may be moved upwardly by the cable 121 and serve to move the bolt 81 off of the supporting finger 82 by reason of an inclined portion 123 formed on the latch bar 122 coming into contact with the supporting member 81. In connection with this manual release, it will be obvious that extensions of the cable 121 could be carried over suitable pulleys and through suitable conduit to remote locations so that the automatic valve might be actuated manually if desired, as upon employees' observing the outbreak of a fire.

As the supervisory operation of this automatic sprinkler and alarm system is dependent upon air pressure of approximately one and one-half (1½) pounds per square inch normally supplied to the heat actuated devices and their communication system and the distributing system piping itself, the air pump and alarm unit generally indicated by the numeral 24 in Figure 1 forms an important part of the system and by referring to Figures 9 and 10 of the drawings the air pump and alarm unit will be seen to comprise the body member 24 upon either side of which there are positioned mechanism enclosing housings 24A and 24B, respectively, which are secured to the body member 24 by means of bolts 125 functioning through openings in flanges 126 formed on the housings 24A and 24B. The housings 24A and 24B are positioned over large openings in the body member 24. Positioned in these large openings are pressure responsive valve operative mechanisms one of which is shown in detail in Figure 10 in the right hand portion thereof.

By referring again to Figure 9 of the drawings, it will be observed that the bottom of the body member 24 is provided with an opening in which is positioned the water leg 38 which is provided at its lower extremity with a cap 39 which in turn is provided with a plugged opening 127. Positioned vertically through the body member 24 and extending downwardly within the water leg 38 there is a secondary water leg 37 which terminates short of the bottom of the water leg 38 and as may be seen by referring to the uppermost portion of the illustration in Figure 9, emerges through an opening in the top of the body member 24 and is provided with the L 36 which forms the overflow passage for water rising upwardly through the secondary water leg 37. The delivery orifice of the L 36 communicates with the funnel 35 on the drain pipe 34 as illustrated in Figure 1 and serves to conduct the overflow water to the drain.

In order that water and air may be introduced into the body member 24 and in order that the air pump action may take place, a jet pump chamber 128 is affixed to one side of the body member 24 as may be seen in Figures 9 and 10, and by referring to Figure 10 and to the right-hand portion thereof wherein a cross sectional detailed view of the jet pump is shown, it will be seen that water entering by way of an orifice 130 is directed, at such time as a water control valve 131 is open, through a jet 132 and into a Venturi jet pump 133 in the chamber 128 by which action it causes a quantity of air to be delivered therewith into the body member 24 of the pump by way of an upwardly extending communication channel 134 which in turn forms a part of a jet pump housing 135 and which is bolted to the body member 24 by bolts 129. Air is introduced into the Venturi jet pump through an orifice 137 in the bottom of the jet pump chamber 128. When the valve 131 is open and water enters from the pipe 25, the resultant action of the water passing into the Venturi jet pump will be the introduction of a suitable quantity of air into the body member 24 along with the water. The water introduced will flow downwardly through the water leg 38 which communicates with the bottom portion of the body member 24 and subsequently rises within the secondary water leg 37 into the uppermost end thereof which is above the body member 24 from which it will be discharged into the funnel 35.

In order that the air introduced into the body member 24 may be retained so that a desirable supervisory air pressure may be built up in the piping of the sprinkler system associated therewith by way of the pipe 30 and in the heat actuated devices 22 and their tubular communicating means 23 by way of the pipes 27 and 29, diaphragms 138 each of which carries a centrally positioned piston like structure 139 are positioned in the large openings between the body member 24 and the housings 24A and 24B, the outer extremities of each of the diaphragms 138 being securely positioned between flange portions of the body member 24 and the flanges 126 of the housings 24A and 24B. Thus air introduced into the body member 24 is restricted thereto by the flexible diaphragms 138 and their piston like structures 139 which form a flexible water and air tight seal.

It will be observed that when due to the continuous operation of the Venturi jet pump, a satisfactory air pressure has been built up within the body member 24 of the pump and the associated piping of the sprinkler system and the system of heat actuated devices or air thermostats 22, the normal tendency of the diaphragm 138 will be to move outwardly into the adjacent housing and in order that this movement may be suitably utilized to control the introduction of fluid into the Venturi jet pump, means has been associated with the diaphragm 138 and the water control valve 131 for either opening or closing the valve 131 in accordance with the position of the diaphragm 138 and its piston like structure 139 which in turn is adjustably opposed by a coil spring 140 with respect to a tubular adjustment member 141 which is positioned in a threaded opening in the housing 24B. The tubular adjustment member 141, threadably positioned in the opening in the housing 24B, permits the tension on the spring 140 to be varied so that any desirable air pressure may be maintained within the body member 24 and the associated piping of the sprinkler system and heat actuated devices. In order that the movement of the piston like structure 139 carried on the diaphragm 138 will result in movement of the water control valve 131, a rod 142 is affixed in an opening formed in a centrally located boss 143 on the piston like structure 139, and extends outwardly therefrom and terminates in a pivot structure 144 connected to an end of a secondary rod 145 which engages a part of the water control valve 131 by reason of an end thereof functioning within a suitable opening in the water control valve 131. The rod 145 is pivoted to an adjacent portion of the jet pump chamber 128 by a pivot 146. Immediately surrounding the rod 145 and the pivot 146 and forming a flexible fluid tight seal, there is a diaphragm gland 147 which is positioned between a bracket 148 located within the housing 24B and a portion of the jet pump chamber 128 so that the rod 145 passes therethrough in a movable manner.

In order that the action of the water control valve 131 may be controlled and adjusted with respect to the air pressure built up within the body member 24 by the pump action, spring tensioned adjustment means have been provided to limit the movement of the rod 142, which is moved by the diaphragm 138 and its piston like structure 139, and comprises a pair of roller carrying arms 149 pivoted at 150 to a bracket 151 which is in turn affixed to the housing 24B.

The rollers carried on the roller arms 149 engage the rod 142 and, as the rod 142 is provided with an irregular surface, tension brought to bear between the opposite ends of the roller arms 149, by means of an adjustably mounted spring 152, effectively controls the movement of the rod 142 until a desirable pressure against the diaphragm 138 has been established. The spring 152 is adjusted with respect to the roller arms 149 by means of an adjustment screw 153.

It will thus be observed that at such times as the air within the body member 24 reaches a predetermined pressure the diaphragm 138 and the piston like structure 139 will sufficiently compress the spring 140 to enable the rods 142 and 145 to close the water control valve 131, and that when such action has taken place, the fluid which has been overflowing through the L 36 on the upper end of the secondary water leg 37 will, as the air pressure within the body member 24 diminishes, drop within the secondary water leg 37 in direct relation thereto and thus serve to maintain the air pressure within the body member as the column of fluid rises in the water leg 38. This action continues until the fluid within the secondary water leg 37 has dropped to a level wherein it can no longer move the water upwardly effectively within the water leg 38. From this point on diminishing air pressure within the body member 24, as may be occasioned by leakage in the sprinkler system, results in the spring 140 moving the diaphragm 138 and the piston like structure 139 into the body member 24 and thus effectively opening the water control valve 131 which completes the cycle of operation. It will be seen that the action of the water powered air pump is entirely automatic and due to the dual water leg construction the air pressure developed by the pump is maintained satisfactorily during the intervals between actual pumping periods.

In order that an alarm may be given upon the loss of supervisory air in the sprinkler system or in the system of heat actuated devices, a duplicate mechanical assembly comprising a diaphragm and a piston structure supported thereby is positioned on the opposite side of the body member 24 within the housing 24A so that upon the continuous rapid reduction of air pressure within the body member 24, the duplicate diaphragm and associated mechanism serves to open an alarm water valve 154 which is positioned in an extension of the fluid supply pipe 25 and which communicates through the pipe 46 with the pipe 45 which leads to the fluid powered siren as heretofore discussed in connection with Figure 1 of the drawings, the outlet to the alarm mechanism indicated by the numeral 46A. The alarm fluid valve 154 is controlled by and connected with a diaphragm assembly exactly the same as that heretofore discussed in connection with the fluid control valve 131 which controls the jet pump and for the purpose of simplicity has not been illustrated in the drawings. Suitable rods comparable in detail to the mechanism heretofore described connect the diaphragm with the alarm fluid valve 154 and are indicated in the drawings by the numerals 156 and 157. The rod 157 being pivoted at a point 158 and passing through a flexible diaphragm gland 159 similar in all respects to the construction heretofore described. The alarm fluid valve assembly is, like the jet pump assembly, bolted to the body 24 by means of bolts 160.

It will thus be seen that the air pump and alarm unit 24 cooperates with the automatic sprinkler and alarm system particularly in the supplying of the necessary supervisory air pressure and, secondary, in providing for a trouble alarm in the event of the loss of supervisory air from the piping of the sprinkler system.

It will further be seen that the automatic sprinkler and alarm system is actuated by water pressure and it is obvious that if desired, a separate water source for the alarm and pump portions of the system might be supplied if the same was desired rather than depending upon the fluid supply normally feeding the system through the pipe 15.

By again referring to Figures 1 and 8 of the drawings, it will be observed that the gate valve alarm 43 forms a portion of the gate valve construction as it is attached to the yoke 40 and engages the shaft 41 of the gate valve 16 and that this valve alarm functions in cooperation with a recess 162 formed in the shaft 41 of the gate valve, the recess 162 is adapted to receive the operating end of a valve lever 163 when the shaft 41 is in an open valve condition. The lever 163 controls a valve 164 for admitting fluid from the pipe 44 leading from the pipe 25 and the main supply pipe 15 below the gate valve 16, to the pipe 45 which as has heretofore been described, communicates with the alarm siren (not shown) at 45A. As in the case of the air pump, the water source to this alarm valve may obviously be independent from the supply source and the pipe 15 if desired. In any event, the closing of the gate valve 16 will cause fluid to flow from the pipe 44 to the pipe 45 and thus actuate the siren alarm at 45A thus giving a signal that the gate valve 16 has been closed and the entire sprinkler system rendered inoperative thereby.

By referring to Figure 11, a detailed cross sectional elevation of the alarm valve 47 may be seen. It will be seen that it comprises a valve seat 165 adapted to be normally closed by a vertically movable valve disk 166 which in turn is part of a valve assembly including a downwardly depending guide 167 which guide has a plurality of vertically positioned openings therein and an upwardly extending rod 168 which telescopically engages a cylinder 169 in the uppermost portion of the alarm valve 47. A coil spring 170 is positioned between a portion of the alarm valve body 47 and the valve assembly disk 166. The tension on the coil spring 170 is adjustable so that the alarm valve can be set to permit the flow of fluid therethrough only at such times as the sprinkler system on which it is installed goes into action delivering fire extinguishing fluid. Fluid enters the alarm valve through an inlet 171 and leaves it through an outlet 172.

By again referring to Figure 1 of the drawings, it will be seen that the automatic sprinkler and alarm system, the subject of this invention, possesses certain inherent advantages not found in other sprinkler systems now known in the art. One of these advantages is in the direct communication of an alarm with the automatic valve 17 through the alarm valve 47 which insures a positive signal being given upon the system's going into action. The combination of the system, the automatic valve 17 and the air pump, the body portion of which is indicated by the numeral 24, results in another advantage; that is, the ability of the system piping 19 and the riser 18 to automatically drain off condensate and residue liquid in the system after operation and after a regular draining through the drain valve 32 and drain pipe 33, the draining of condensate and residue liquid occurring by means of a by-pass or dribble like action through the velocity ball check valve 31 interposed in the pipe 30 between the air pump 24 and the riser 18. The velocity ball check valve 31 normally permits air to flow from the pump body 24 to the riser 18 and when a system goes into action in extinguishing a fire, it prevents fluid from the system flowing backwardly into the pump 24; however, it permits a dribble like action at all times which is sufficient to drain off liquid in the riser 18 above this point. By referring to Figure 12 of the drawings, a cross sectional side elevation of the velocity ball check valve 31 may be seen to comprise a pair of valve bodies 31 and 31A threadably engaging one another and containing a ball 31B which is adapted to normally remain in the position shown but which will move in response to abnormal pressure from the right hand side toward the valve seat 31C formed in the body 31. The valve seat 31C is provided with a relatively small notch 31D which causes the velocity ball check valve to open faster when abnormal pressure against the same is released. The seat portion 31C of the valve is positioned opposite the pressure inlet which in this disclosure is the pipe 30 leading from the riser 18. The clapper 57 of the valve 17 is therefore always automatically primed and, at the same time, no extra and additional piping or other means is necessary which would have to be manually operated, for providing periodic drainage of excess liquid from the system.

The automatic sprinkler and alarm system shown and described herein comprises, therefore, an assembly of interdependent parts all of which are primarily hydraulically powered thus rendering the system independent of electric power failure and insuring the positive protection and fire control at all times. Through the system of alarms, the sprinkler system, the subject of this invention, signals upon the determination of a fire, signals through separate and distinct systems when it goes into operation in controlling a fire, and provides for the giving of signals if the pipes of the sprinkler system are damaged in any manner and provides for the giving of signals if the thermostatic actuating system comprising the heat actuated devices and their connecting tubing be damaged. The arrangement also provides for the manual actuation of the system in the event that fire is observed before the system goes into automatic operation and fulfills in all respects all possible requirements for a completely automatic sprinkler and alarm system, and also provides for the automatic priming and the drainage of excess fluid at all times thus rendering the system independent of periodic inspection.

Having thus described my invention, what I claim is:

1. In a fire extinguishing system having distributing pipes normally containing air at 1½ pounds pressure, and an automatic valve in connection with the said distributing pipes for controlling the entrance of fire extinguishing fluid thereinto, means to render the said automatic valve responsive to a reduction in air pressure, communication means for supplying air to the said distributing pipes and for draining off excess fluid above the priming level of the said automatic valve when the automatic valve is closed, a velocity ball check valve in said communication means adapted to close against abnormal pressure at such time as the automatic valve opens and permits fire extinguishing fluid to flow rapidly thereagainst and into the system of distributing pipes as in controlling a fire, and to remain open to low velocity fluid flow therethrough in either direction under normal conditions.

2. In a fire extinguishing system having distributing pipes normally containing supervisory air at 1½ pounds pressure, and an automatic valve in connection with the said distributing pipes for controlling the entrance of fire extinguishing fluid thereinto, means to render the said automatic valve responsive to pneumatic impulses generated by a system of remotely positioned heat actuated devices, an air pump and communication means for supplying air to the said distributing pipes and for draining off excess fluid above the priming level of the said automatic valve when the automatic valve is closed, a velocity ball check valve in the said communication means adapted to close against abnormal pressure at such time as the automatic valve opens and permits fire extinguishing fluid to flow into the system of distributing pipes in controlling a fire.

3. In a fire extinguishing apparatus comprising a system of distributing pipes and an automatic valve mechanism for controlling the entrance of fire extinguishing fluid thereto, an air source in communication with the said system for maintaining air pressure therein, and means for draining excess liquid from the said distributing pipes, said means comprising a velocity ball check valve interposed between the said distributing pipes and the said air source and adapted to permit passage of air from the air source to the distributing pipes and low velocity passage of fluid from the said distributing pipes to the said air source when the fire extinguishing system is not in operation extinguishing a fire, and to close the communication passage upon subjection to high velocity fire extinguishing fluid flow, means for initiating an alarm at such times as there is fire extinguishing fluid present in the distributing pipes, said means comprising a normally closed spring restrained valve in direct communication with the distribution side of the said automatic valve, the said spring restrained valve responsive to an increase of pressure thereagainst together with alarm means in connection with the said spring restrained valve.

4. In a fire extinguishing system comprising a set of fluid distributing pipes and a valve element subject to actuation by a system of heat actuated devices in connection therewith, said valve element controlling the entrance of fire extinguishing fluid into the said distributing pipes, means in communication with said distributing pipes for maintaining air pressure other than atmospheric therein, said pressure maintaining means comprising an air pump enclosing an air head and including a water column and overflow therefor forming a liquid seal, and means in association with the said pressure maintaining communication means for draining excess liquid from the said distributing pipes when the said fire extinguishing system is not in operation extinguishing a fire, the said means comprising a velocity ball check valve interposed between the said pressure maintaining means and the said distributing pipes, the said velocity ball check valve adapted to close responsive to rapid fluid flow therethrough.

HARRY N. RIDER.